United States Patent
Gao et al.

(10) Patent No.: US 11,570,343 B2
(45) Date of Patent: Jan. 31, 2023

(54) FLOATING TOUCH CAMERA MODULE, ELECTRONIC DEVICE AND TOUCH METHOD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Fei Gao, Beijing (CN); Xuerong Wang, Beijing (CN); Lingyun Shi, Beijing (CN); Lu Yu, Beijing (CN); Lei Chen, Beijing (CN); Junjie Ma, Beijing (CN); Xuqing Feng, Beijing (CN); Pengfei Cheng, Beijing (CN); Xin Ma, Beijing (CN); Yuanda Lu, Beijing (CN); Haixu Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 361 days.

(21) Appl. No.: 16/647,644

(22) PCT Filed: Mar. 22, 2019

(86) PCT No.: PCT/CN2019/079220
§ 371 (c)(1),
(2) Date: Mar. 16, 2020

(87) PCT Pub. No.: WO2019/184809
PCT Pub. Date: Oct. 3, 2019

(65) Prior Publication Data
US 2020/0280662 A1  Sep. 3, 2020

(30) Foreign Application Priority Data
Mar. 26, 2018 (CN) .......................... 201810252967.7

(51) Int. Cl.
*H04N 5/225* (2006.01)
*G06F 3/042* (2006.01)
*H04M 1/02* (2006.01)

(52) U.S. Cl.
CPC ......... *H04N 5/2257* (2013.01); *G06F 3/0421* (2013.01); *H04M 1/0264* (2013.01); *H04N 5/2254* (2013.01)

(58) Field of Classification Search
None
See application file for complete search history.

(56) References Cited

U.S. PATENT DOCUMENTS 8,139,046 B2   3/2012  Kweon et al.

FOREIGN PATENT DOCUMENTS

| CN | 102902083 A | 1/2013 |
| CN | 203733133 U | 7/2014 |

(Continued)

OTHER PUBLICATIONS

International Search Report and Written Opinion for Application No. PCT/CN2019/079220, dated Jun. 13, 2019, 10 Pages.

*Primary Examiner* — Willie J Daniel, Jr.
(74) *Attorney, Agent, or Firm* — Brooks Kushman P.C.

(57) ABSTRACT

The present disclosure provides a floating touch camera module, a display device and a touch method. The floating touch camera module includes: a lens with a light collection surface and a light emitting surface; an image sensor at one side of the light emitting surface of the lens, the image sensor configured to receive light rays from the lens and form sensing information; and an infrared cut filter film at one side of a light incident surface of the image sensor and (Continued)

configured to filter out infrared light rays. The infrared cut filter film is movable relative to the lens between a first position at which the infrared cut filter film directly faces the lens and a second position at which the infrared cut filter film is offset from the lens, thereby enabling the floating touch camera module to switch between a photographing mode and a touch mode.

15 Claims, 4 Drawing Sheets

(56) References Cited

FOREIGN PATENT DOCUMENTS

| CN | 106200904 A | 12/2016 |
| CN | 206472227 U | 9/2017 |
| CN | 108449531 A | 8/2018 |

FLOATING TOUCH CAMERA MODULE, ELECTRONIC DEVICE AND TOUCH METHOD

CROSS-REFERENCE TO RELATED APPLICATIONS

This application is the U.S. national phase of PCT Application No. PCT/CN2019/079220 filed on Mar. 22, 2019, which claims priority to Chinese Patent Application No. 201810252967.7, filled on Mar. 26, 2018, which are incorporated herein by reference in their entireties.

TECHNICAL FIELD

The present disclosure relates to the field of displaying technologies, and in particular to a floating touch camera module, an electronic device, and a touch method.

BACKGROUND

The floating touch technology is to use a camera to capture gesture signals of the hand above a screen to achieve floating touch for a display device. At present, camera modules provided in display devices such as mobile phones are mainly used for photographing and cannot realize floating touch.

SUMMARY

In one aspect, one embodiment of the present disclosure provides a floating touch camera module including: a lens with a light collection surface and a light emitting surface; an image sensor at one side of the light emitting surface of the lens; wherein the image sensor is configured to receive light rays from the lens and form sensing information; and an infrared cut filter film at one side of a light incident surface of the image sensor and configured to filter out infrared light rays. The infrared cut filter film is movable relative to the lens between a first position at which the infrared cut filter film directly faces the lens and a second position at which the infrared cut filter film is offset from the lens, thereby enabling the floating touch camera module to switch between a photographing mode and a touch mode.

Further, the infrared cut filter film is at one side of the light collection surface of the lens.

Further, the infrared cut filter film is between the light emitting surface of the lens and the light incident surface of the image sensor.

Further, the floating touch camera module further includes an anti-reflection film; the anti-reflection film is at one side of the light incident surface of the image sensor.

Further, the anti-reflection film is at one side of the light collection surface of the lens.

Further, the anti-reflection film is between the light emitting surface of the lens and the light incident surface of the image sensor.

Further, the anti-reflection film is fixedly disposed at a position at which the anti-reflection film directly faces the lens.

Further, the anti-reflection film is movable relative to the lens between a third position at which the anti-reflection film is offset from the lens and a fourth position at which the anti-reflection film directly faces the lens.

Further, the anti-reflection film is a full-spectrum anti-reflection film.

Further, the floating touch camera module further includes a moving structure; the moving structure drives the infrared cut filter film to move relative to the lens between the first position and the second position; the moving structure drives the anti-reflection film to move relative to the lens between a third position at which the anti-reflection film is offset from the lens and a fourth position at which the anti-reflection film directly faces the lens.

Further, the floating touch camera module further includes a moving structure; the moving structure drives the infrared cut filter film to move relative to the lens between the first position and the second position.

Further, the floating touch camera module further includes: a light intensity detector configured to detect intensity of ambient light rays; and, an infrared supplementary lighting lamp coupled with the light intensity detector and configured to emit infrared light rays to ambient environment when the intensity of ambient light rays is less than or equal to a preset value.

In another aspect, one embodiment of the present disclosure provides an electronic device including: the above floating touch camera module; an image processor electrically coupled with the image sensor of the floating touch camera module. The image processor is configure to, process sensing information of the image sensor to obtain image information when the floating touch camera module is in the photographing mode; and, recognize sensing information of the image sensor to obtain gesture motion information when the floating touch camera module is in the touch mode.

Further, the image processor includes a first recognizer coupled with the image sensor; wherein the first recognizer is configured to, when the intensity of ambient light rays is less than or equal to the preset value, recognize and process first sensing information and second sensing information of the image sensor to obtain gesture motion information; wherein the first sensing information is sensing information obtained by the image sensor when the infrared supplementary lighting lamp is on, and the second sensing information is sensing information obtained by the image sensor when the infrared supplementary lighting lamp is off.

In another aspect, one embodiment of the present disclosure provides a touch method, applied to the above electronic device, including: controlling the infrared cut filter film of the floating touch camera module of the electronic device to move from a first position at which the infrared cut filter film directly faces the lens of the floating touch camera module to a second position at which the infrared cut filter film is offset from the lens; and recognizing sensing information of the image sensor of the floating touch camera module to obtain gesture motion information.

Further, the floating touch camera module further includes an anti-reflection film; and the method further includes: controlling the anti-reflection film to directly face the lens.

Further, the floating touch camera module further includes an anti-reflection film; and the method further includes: controlling the anti-reflection film to move between a third position at which the anti-reflection film is offset from the lens and a fourth position at which the anti-reflection film directly faces the lens.

Further, recognizing sensing information of the image sensor of the floating touch camera module to obtain gesture motion information, includes:

when the intensity of ambient light rays is less than or equal to the preset value, controlling the infrared supplementary lighting lamp of the floating touch camera module to flash;

using the image sensor to obtain first sensing information when the infrared supplementary lighting lamp is on and second sensing information when the infrared supplementary lighting lamp is off; and recognizing and processing the first sensing information and the second sensing information of the image sensor to obtain gesture motion information.

DETAILED DESCRIPTION

Figure 1:
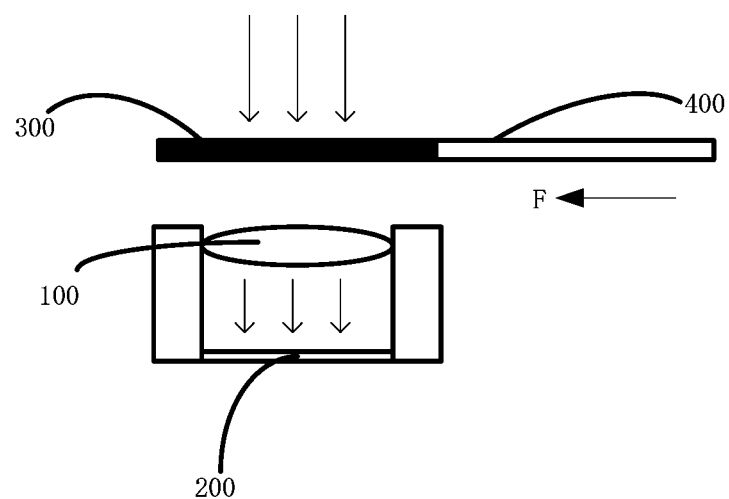
FIG. 1 is a schematic diagram of a floating touch camera module in a photographing mode according to an embodiment of the present disclosure.

In order to make technical problems to be solved, technical solutions, and advantages of the present disclosure more clearly, detailed description will be provided hereinafter in conjunction with the accompanying drawings and embodiments.

At present, camera modules provided in display devices such as mobile phones are mainly used for photographing. In order to prevent images from being affected by infrared rays, an infrared filter is provided. However, due to the presence of the infrared filter, the camera module is unable to capture infrared signals of the hand above a screen. Therefore, an additional infrared camera module is further added to the display device such as the mobile phone to realize floating touch.

In view of problems in the related art that large space is occupied by a normal camera module and an additional infrared camera module, which have to be separately provided in an electronic device to realize the photographing and floating touch functions, thereby resulting in a less compact structure which is not conducive to the overall space layout of the whole machine, embodiments of the present disclosure provide a floating touch camera module, a display device and a touch method, which can realize both of photographing and floating touch functions through an identical camera module, thereby resulting in a compact structure, reducing an occupied space and improving utilization ratio of space area of the whole machine design.

As shown in FIG. 1 to FIG. 4, one embodiment of the present disclosure provides a floating touch camera module, including:

a lens 100 for collecting light rays, where the lens 100 includes a light collection surface and a light emitting surface;

an image sensor 200 capable of receiving light rays from the lens 100 and forming sensing information, and disposed at one side of the light emitting surface of the lens 100; and an infrared cut filter film 300 for filtering out infrared light rays, disposed at one side of the light collection surface of the lens 100, and/or disposed between the lens 100 and the image sensor 200.

The infrared cut filter film 300 is movable relative to the lens 100, thereby enabling the floating touch camera module to switch between a photographing mode and a touch mode.

In the photographing mode, the infrared cut filter film 300 is located at a first position directly facing the lens 100, so that the light rays collected by the lens 100 are first filtered out of infrared light rays and then enter the image sensor 200.

In the touch mode, the infrared cut filter film 300 is located at a second position offset from the lens 100, so that the light rays collected by the lens 100 including the infrared light rays, enter the image sensor 200.

In some embodiments, one side of the image sensor 200 adjacent to the light emitting surface of the lens 100 is a light incident surface.

In the above solution, by setting the infrared cut filter film 300 to be movable relative to the lens 100, when the photographing is required, the infrared cut filter film 300 directly faces the lens 100. In this way, infrared light rays in natural light rays will be filtered out before the light rays enter the image sensor 200, thereby preventing the images from being affected by the infrared light rays. Further, the floating touch camera module can restore real colors without disturbing the color restoration, thereby realizing the photographing function via the floating touch camera module. When the floating touch is required, the infrared cut filter film 300 is offset from the lens 100, the infrared cut filter film 300 stops working, and then light rays entering the image sensor 200 are full-spectrum light rays including infrared light rays. In this way, hand movements can be captured, thereby realizing the floating touch function.

Therefore, the floating touch camera module provided in the embodiment of the present disclosure can use the identical one camera module to realize both of the photographing function and the floating touch function. When the photographing function is required, the identical one camera can take normal pictures. When the floating touch function is required, the identical one camera can collect full-spectrum light rays including infrared light ray for realizing the floating touch function. Comparing with the solution in the related art that a normal camera module and an additional infrared camera module have to be separately provided in an electronic device, the floating touch camera module provided in the embodiment of the present disclosure can provide a compact structure, reduce space occupied by cameras and is conducive to the overall structure layout of the whole electronic device.

Figure 2:
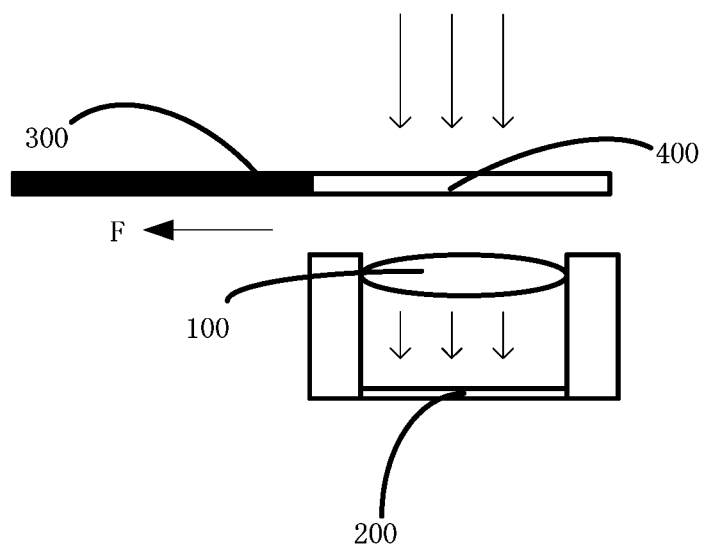
FIG. 2 is a schematic diagram of the floating touch camera module in a touch mode according to an embodiment of the present disclosure.
Figure 8:
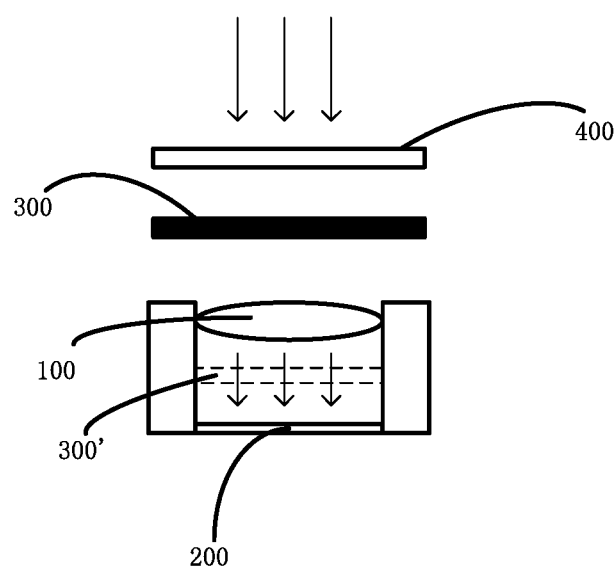
FIG. 8 is a schematic diagram of a floating touch camera module in a photographing mode according to another embodiment of the present disclosure.

It should be noted that, in the floating touch camera module, the infrared cut filter film 300 may be disposed at the light collection surface of the lens 100 or the light emitting surface of the lens 100, as long as the infrared light rays in the natural light rays collected by the lens 100 are filtered out by the infrared cut filter film 300 before the light rays enter the image sensor 200. For example, as shown in FIG. 1 and FIG. 2, the infrared cut filter film 300 may be disposed at one side of the light collection surface of the lens 100; and an infrared cut filter film 300' shown in a dotted line in FIG. 8 is between the lens 100 and the image sensor 200.

It should be noted that, in the above solution, the relative movement between the infrared cut filter film 300 and the lens 100 may be implemented by moving the infrared cut filter film 300 or the lens 100 after the floating touch camera module is installed in an electronic device.

Further, in the floating touch camera module provided in the embodiment of the present disclosure, as shown in FIG. 1 to FIG. 4, the floating touch camera module further includes an anti-reflection film 400. The anti-reflection film 400 is disposed at one side of the light collection surface of the lens 100, and/or disposed between the lens 100 and the image sensor 200. The anti-reflection film 400 is movable relative to the lens 100. In the photographing mode, the anti-reflection film 400 is located at a third position offset from the lens 100. In the touch mode, the anti-reflection film 400 is located at a fourth position directly facing the lens 100.

In the above solution, the floating touch camera module is further provided with the anti-reflection film 400 which is also movable relative to the lens 100. Thus, in the photographing mode, the anti-reflection film 400 is moved to a position offset from the lens 100, while the infrared cut filter film 300 is moved to a position directly facing the lens 100. Then, the infrared cut filter film 300 operates, so that the infrared light rays in the natural light rays collected by the lens 100 are filtered out, thereby preventing the images from being affected by the infrared light rays. Further, the floating touch camera module can restore real colors without disturbing the color restoration. In the touch mode, the anti-reflection film 400 is moved to a position directly facing the lens 100, while the infrared cut filter film 300 is moved to a position offset from the lens 100. In this way, the anti-reflection film 400 can enhance transmission intensity of light rays entering the image sensor 200, so that the floating touch camera module can fully receive natural light rays including the infrared light rays, thereby capturing movements of the hand to realize the floating touch.

It should be noted that, in the above solution, the anti-reflection film 400 may be a full-spectrum anti-reflection film, so that in the touch mode, the light rays entering the image sensor 200 are full-spectrum light rays including infrared light rays. It is understood that in practical applications, the anti-reflection film 400 may be other types of anti-reflection film 400 according to actual needs, which is not limited thereto.

In addition, the anti-reflection film 400 may be disposed at one side of the light collection surface of the lens 100 or at one side of the light emitting surface of the lens 100, which is not limited thereto.

Figure 3:
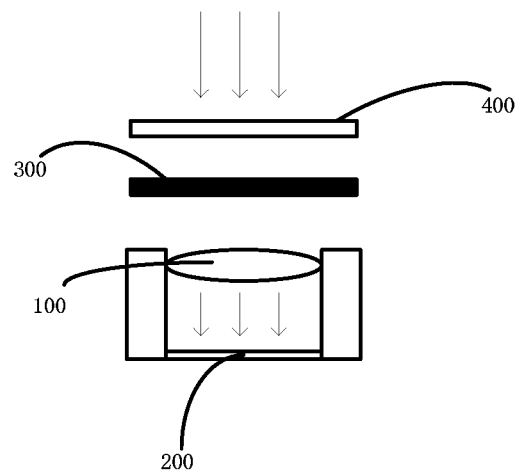
FIG. 3 is a schematic diagram of a floating touch camera module in a photographing mode according to another embodiment of the present disclosure.
Figure 4:
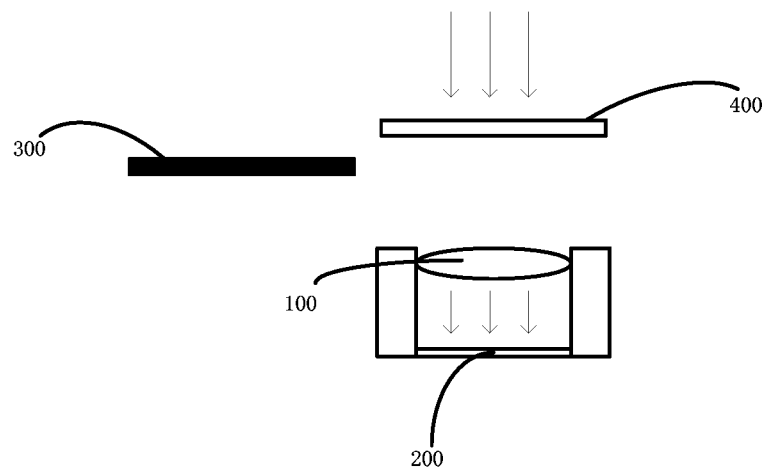
FIG. 4 is a schematic diagram of the floating touch camera module in a touch mode according to another embodiment of the present disclosure.

In addition, it should be noted that, in the above exemplary embodiment, the anti-reflection film 400 may be moved to a position offset from the lens 100 in the photographing mode; in other embodiments, since the anti-reflection film 400 can enhance transmission intensity of light rays, as shown in FIG. 3 and FIG. 4, the anti-reflection film 400 may also be fixedly disposed at a position directly facing the lens 100. In this way, in both the photographing mode and the touch mode, the anti-reflection film 400 directly faces the lens 100 and then enhances transmission intensity of light rays entering the floating touch camera module.

In addition, the floating touch camera module further includes a moving structure. Both of the anti-reflection film 400 and the infrared cut filter film 300 are driven by the moving structure to move. When the infrared cut filter film is driven by the moving structure to move from the first position to the second position, the anti-reflection film 400 is moved from the third position to the fourth position. In some embodiments, both of the first position and the fourth position are positions that directly face the lens 100.

With the above solution, the infrared cut filter film 300 and the anti-reflection film 400 may be moved by the identical moving structure. When switching between the photographing mode and the touch mode, the moving structure can simultaneously change positions of the infrared cut filter film 300 and the anti-reflection film 400.

For example, the moving structure may include a slide rail and a bracket movable on the slide rail. As shown in FIG. 1 and FIG. 2, the infrared cut filter film 300 and the anti-reflection film 400 may be disposed at one side of the lens 100, and may be driven by the bracket to slide horizontally. The infrared cut filter film 300 and the anti-reflection film 400 may be connected through the bracket. The infrared cut filter film 300 is located at one side of the anti-reflection film 400. When the bracket of the moving structure slides along a direction indicated with F shown in FIG. 1, the infrared cut filter film 300 moves along the F direction shown in FIG. 1 from the first position directly facing the lens 100 to the second position offset the lens 100. Meanwhile, the anti-reflection film 400 is driven by the bracket to move along the F direction shown in FIG. 1, from the third position offset from the lens 100 to the fourth position directly facing the lens 100.

Figure 7:
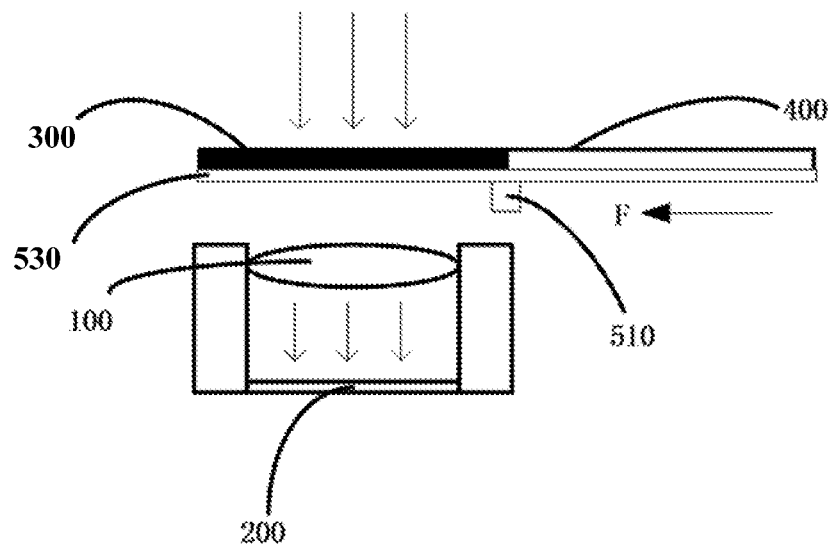
FIG. 7 is a schematic diagram of a floating touch camera module in a photographing mode according to an embodiment of the present disclosure.

It should be noted that specific structures of the moving structure are not limited thereto, and may be implemented in various manners. For example, as shown in FIG. 7, the moving structure may further include a rotation shaft 510 and a rotation disk 530 connected with the rotation shaft. The infrared cut filter film and the anti-reflection film 400 may be disposed on the rotation disk 530. When the rotation disk 530 is rotated, the infrared cut filter film and the anti-reflection film 400 move along the rotation disk to change their positions, i.e., enabling the infrared cut filter film to directly face the lens 100 or offset from the lens, and enabling the anti-reflection film 400 to directly face the lens 100 or offset from the lens. In one embodiment, the rotation disk 530 is transparent.

In addition, in the floating touch camera module provided in the embodiment of the present disclosure, the floating touch camera module may further include:

a light intensity detector for detecting intensity of ambient light rays;

an infrared supplementary lighting lamp coupled with the light intensity detector and used for flashing at a predetermined frequency to emit infrared light rays to the ambient environment when the intensity of ambient light rays is less than or equal to a preset value.

In the above solution, the presence of the light intensity detector can detect intensity of ambient light rays and the infrared supplementary lighting lamp can emit infrared light rays to the ambient environment to fill the light. In this way, when the floating touch camera module is in touch mode, if the ambient light rays are sufficient (for example, during the daytime), the image sensor 200 sufficiently receives the natural light rays including the infrared light rays to form sensing information, thereby capturing movements of the hand to obtain gesture motion information to realize the floating touch. When the ambient light rays are insufficient (for example, at night), the infrared supplementary lighting lamp flashes to emit infrared light rays to the ambient environment. At this point, the image sensor 200 receives two kinds of light rays from the lens 100, i.e., one is the normal ambient light rays, and the other is the ambient light rays when the infrared supplementary lighting lamp is on. The image sensor 200 forms first sensing information when receiving the normal ambient light rays. The image sensor 200 forms second sensing information when receiving the ambient light rays when the infrared supplementary lighting lamp is on. In this way, two different gesture contour images can be formed, and the electronic device can accurately capture motion commands through image recognition and image fusion correction, thereby realizing the floating touch.

Figure 5:
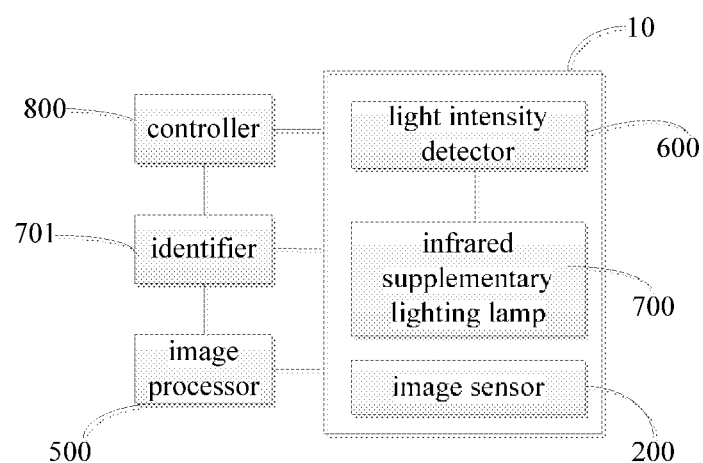
FIG. 5 is schematic diagram of an electronic device according to an embodiment of the present disclosure.

Further, as shown in FIG. 5, one embodiment of the present disclosure further provides an electronic device, including: the floating touch camera module 10 provided in the embodiment of the present disclosure; and, an image processor 500 electrically coupled with the image sensor 200. The image processor 500 is used to, process sensing information of the image sensor 200 to obtain image information when the floating touch camera module 10 is in the photographing mode; and, recognize sensing information of the image sensor 200 to obtain gesture motion information when the floating touch camera module 10 is in the touch mode.

In the above solution, by setting the infrared cut filter film 300 to be movable relative to the lens 100, when the floating touch camera module 10 is in the photographing mode, the infrared cut filter film 300 directly faces the lens 100. In this way, infrared light rays in natural light rays will be filtered out before the light rays enter the image sensor 200, thereby preventing the images from being affected by the infrared light rays. The image processor 500 can process sensing information of the image sensor 200 to obtain image information, thereby realizing the photographing function. Since the infrared light rays are filtered out, the floating touch camera module can restore real colors without disturbing the color restoration. When the floating touch camera module 10 is in the touch mode, the infrared cut filter film 300 is offset from the lens 100 and stops working, and then light rays entering the image sensor 200 are full-spectrum light rays including infrared light rays. In this way, hand movements can be captured, and the image processor 500 can recognize sensing information of the image sensor 200 to obtain gesture motion information, thereby realizing the floating touch function.

Therefore, the electronic device provided in the embodiment of the present disclosure can use the identical floating touch camera module 10 to realize both of the photographing function and the floating touch function. When the photographing function is required, the identical floating touch camera module 10 can take normal pictures. When the floating touch function is required, the identical floating touch camera module 10 can collect full-spectrum light rays including infrared light ray for realizing the floating touch function. Comparing with the solution in the related art that a normal camera module and an additional infrared camera module have to be separately provided in an electronic device, the floating touch camera module provided in the embodiment of the present disclosure can provide a compact structure, reduce space occupied by cameras and is conducive to the overall structure layout of the whole electronic device.

In addition, in the electronic device provided in the embodiment of the present disclosure, optionally, the floating touch camera module 10 may further include: a light intensity detector 600 for detecting intensity of ambient light rays; an infrared supplementary lighting lamp 700 coupled with the light intensity detector 600 and used for flashing at a predetermined frequency to emit infrared light rays to the ambient environment when the intensity of ambient light rays is less than or equal to a preset value.

The image processor 500 includes:

a first recognizer coupled with the image sensor 200; where the first recognizer is used to, when the floating touch camera module 10 is in the touch mode and the intensity of ambient light rays detected by the light intensity detector 600 is less than or equal to the preset value, recognize and process first sensing information and second sensing information of the image sensor 200 to obtain gesture motion information, where the first sensing information is sensing information obtained by the image sensor 200 when the infrared supplementary lighting lamp is on, and the second sensing information is sensing information obtained by the image sensor 200 when the infrared supplementary lighting lamp is off;

a second recognizer coupled with the image sensor 200; where the second recognizer is used to, when the floating touch camera module 10 is in the touch mode and the intensity of ambient light rays is greater than the preset value, recognize and process sensing information of the image sensor 200 to obtain gesture motion; and a third recognizer coupled with the image sensor 200; where the third recognizer is used to, when the floating touch camera module 10 is in the photographing mode, recognize sensing information of the image sensor 200 to obtain image information.

In the above solution, the presence of the light intensity detector 600 can detect intensity of ambient light rays and the infrared supplementary lighting lamp 700 can emit infrared light rays to the ambient environment to fill the light. In this way, when the floating touch camera module 10 is in the photographing mode, the image sensor 200 receives the light rays without infrared light rays from the lens 100 and forms sensing information. The image processor 500 recognizes and processes the sensing information to obtain image information and present it normally, thereby realizing normal photographing function.

When the floating touch camera module 10 is in the touch mode and the ambient light rays are sufficient, the image sensor 200 sufficiently receives natural light rays including infrared light rays to form sensing information, thereby capturing hand movements. The image processor 500 recognizes and processes the sensing information to obtain gesture motion information, thereby realizing floating touch. When the floating touch camera module 10 is in the touch mode and the ambient light rays are insufficient, the infrared supplementary lighting lamp 700 flashes to emit infrared light rays to the ambient environment. At this point, the image sensor 200 receives two kinds of light rays from the lens 100, i.e., one is the normal ambient light rays, and the other is the ambient light rays when the infrared supplementary lighting lamp 700 is on. The image sensor 200 forms first sensing information when receiving the normal ambient light rays. The image sensor 200 forms second sensing information when receiving the ambient light rays when the infrared supplementary lighting lamp 700 is on. In this way, two different gesture contour images can be formed, and the image processor 500 can accurately capture motion commands through image recognition and image fusion correction, thereby realizing the floating touch.

In addition, in the electronic device provided in the embodiment of the present disclosure, optionally, the electronic device further includes:

an identifier 701 coupled with the image processor 500 and used to identify a user operation instruction when the floating touch camera module 10 is turned on; where the user operation instruction includes that the user's current operation is photographing operation or the user's current operation is touch operation; and a controller 800 with the floating touch camera module 10 and the identifier 701 and used to control the floating touch camera module 10 to switch between the photographing mode and the touch mode according to the user operation instruction identified by the identifier 701.

The image processor 500 is further coupled with the identifier 701, and is used to perform corresponding recognition and processing on the sensing information of the image sensor 200 according to the user operation instruction identified by the identifier 701.

In the above solution, the presence of the identifier 701 can determine the user's current operation instruction, that is, determining whether the user's current operation is a photographing operation or a touch operation, and transmitting a determination result to the controller 800 and the image processor 500. The controller 800 switches to the photographing mode when the user's current operation is the photographing operation; and switches to the touch mode when the user's current operation is the touch operation. When the user's current operation is the photographing operation, the image processor 500 recognizes and processes the sensing information of the image sensor 200 and forms image information, thereby realizing the photographing function. When the user's current operation is the touch operation, the image processor 500 recognizes and processes the sensing information of the image sensor 200 and forms gesture motion information, thereby realizing the touch function.

It should be noted that, in the foregoing solution, the identifier 701 may employ a face recognition module or a macro judgment module to identify the user's current operation, thereby automatically implementing the photographing function or the touch function according to the user's current operation when the user turns on the camera. It should be understood that, in practical applications, the photographing mode and the touch mode of the floating touch camera module 10 may be manually turned on.

Figure 6:
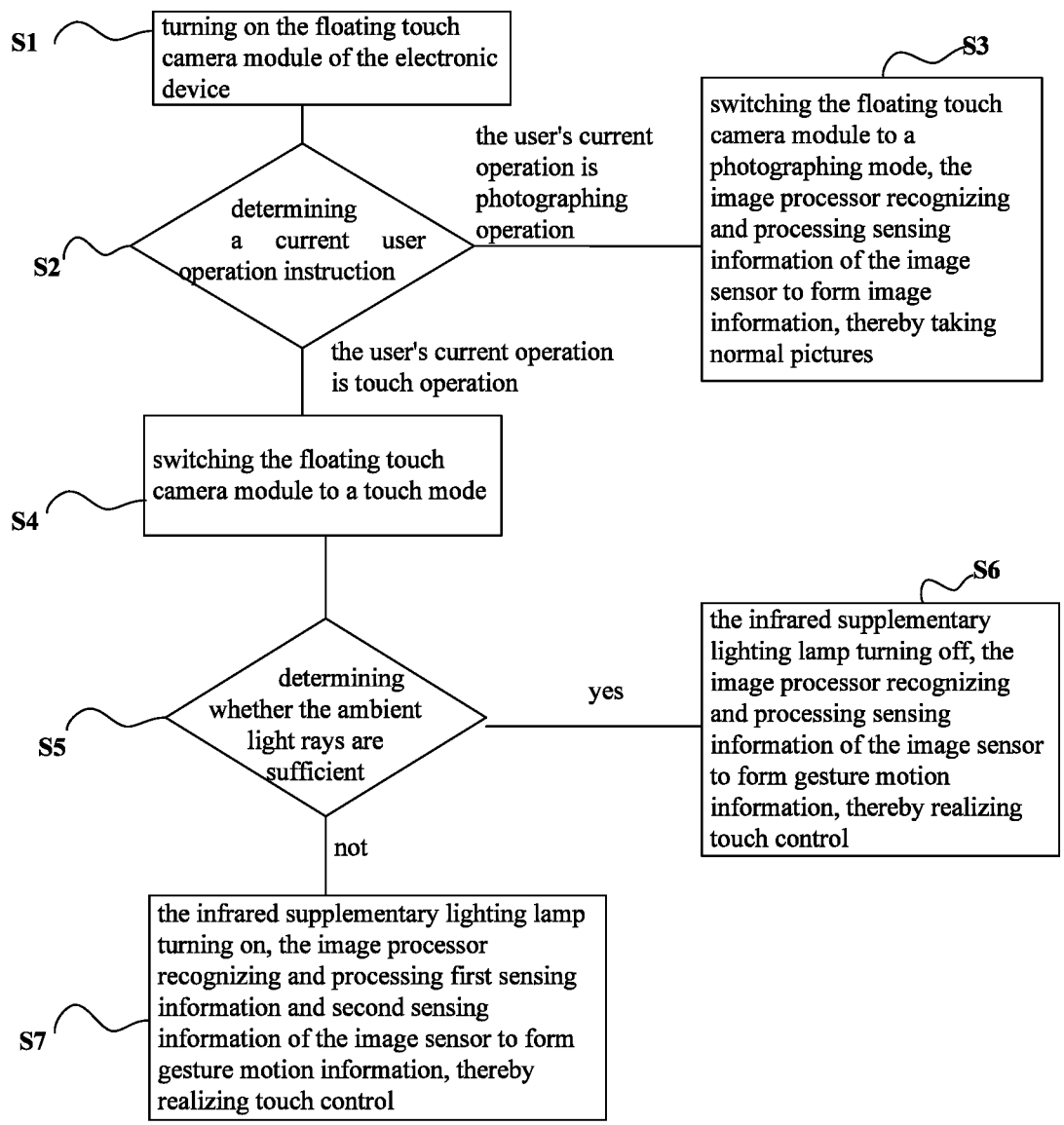
FIG. 6 is a flowchart showing operations of an electronic device according to an embodiment of the present disclosure.

FIG. 6 is a flowchart showing operations of the electronic device according to the above optional embodiment of the present disclosure.

As shown in FIG. 6, operations of the electronic device includes:

S1: turning on the floating touch camera module of the electronic device;

S2: determining a current user operation instruction, where the user operation instruction includes that the user's current operation is photographing operation or the user's current operation is touch operation;

S3: when the user's current operation is the photographing operation, switching the floating touch camera module to a photographing mode, the image processor 500 recognizing and processing sensing information of the image sensor 200 to form image information, thereby taking normal pictures;

S4: when the user's current operation is the touch operation, switching the floating touch camera module to a touch mode;

S5: detecting intensity of ambient light rays, and determining whether the ambient light rays are sufficient;

S6: when the intensity of ambient light rays is greater than a preset value, the infrared supplementary lighting lamp 700 turning off, the image processor 500 recognizing and processing sensing information of the image sensor 200 to form gesture motion information, thereby realizing touch control;

S7: when the intensity of ambient light rays is less than or equal to the preset value, the infrared supplementary lighting lamp 700 turning on, the image processor 500 recognizing and processing first sensing information and second sensing information of the image sensor 200 to form gesture motion information, thereby realizing touch control; where the first sensing information is sensing information obtained by the image sensor 200 when the infrared supplementary lighting lamp is on, and the second sensing information is sensing information obtained by the image sensor 200 when the infrared supplementary lighting lamp is off.

Further, one embodiment of the present disclosure provides a touch method, which is applied to the electronic device in the embodiment of the present disclosure. The method includes:

Step S01: when the floating touch camera module is in the photographing mode, controlling the infrared cut filter film 300 to be at a first position directly facing the lens 100, and processing sensing information of the image sensor 200 to obtain image information;

Step S02: when the floating touch camera module is in the touch mode, controlling the infrared cut filter film 300 to be at a second position offset from the lens 100, and processing sensing information of the image sensor 200 to obtain gesture motion information.

In the above solution, when the photographing is required, the infrared cut filter film 300 directly faces the lens 100. In this way, infrared light rays in natural light rays will be filtered out before the light rays enter the image sensor 200, thereby preventing the images from being affected by the infrared light rays. Further, the floating touch camera module can restore real colors without disturbing the color restoration, thereby realizing the photographing function via the floating touch camera module. When the floating touch is required, the infrared cut filter film 300 is offset from the lens 100, the infrared cut filter film 300 stops working, and then light rays entering the image sensor 200 are full-spectrum light rays including infrared light rays. In this way, hand movements can be captured, thereby realizing the floating touch function.

Therefore, the touch method provided in the embodiment of the present disclosure can realize both of the photographing function and the floating touch function through changes of relative positions between the infrared cut filter film 300 and the lens 100 of the identical one camera module. When the photographing function is required, the identical one camera can take normal pictures. When the floating touch function is required, the identical one camera can collect full-spectrum light rays including infrared light ray for realizing the floating touch function. Comparing with the solution in the related art that a normal camera module and an additional infrared camera module have to be separately provided in an electronic device, the touch method can provide a compact structure, reduce space occupied by cameras and is conducive to the overall structure layout of the whole electronic device.

In addition, in the optional embodiment provided in the present disclosure, the floating touch camera module further includes an anti-reflection film 400, and the method further includes:

when the floating touch camera module is in the photographing mode, controlling the anti-reflection film 400 to be at a third position offset from the lens 100;

when the floating touch camera module is in the touch mode, controlling the anti-reflection film 400 to be at a fourth position directly facing the lens 100.

In the above solution, the floating touch camera module is further provided with the anti-reflection film 400 which is also movable relative to the lens 100. Thus, in the normal photographing mode, the anti-reflection film 400 is moved to a position offset from the lens 100, while the infrared cut filter film 300 is moved to a position directly facing the lens 100. Then, the infrared cut filter film 300 operates, so that the infrared light rays in the natural light rays collected by the lens 100 are filtered out, thereby preventing the images from being affected by the infrared light rays. Further, the floating touch camera module can restore real colors without disturbing the color restoration. In the floating touch mode, the anti-reflection film 400 is moved to a position directly facing the lens 100, while the infrared cut filter film 300 is moved to a position offset from the lens 100. In this way, the anti-reflection film 400 can enhance transmission intensity of light rays entering the image sensor 200, so that the floating touch camera module can fully receive natural light rays including the infrared light rays, thereby capturing movements of the hand to realize the floating touch.

It should be noted that, in the above solution, the anti-reflection film 400 may be a full-spectrum anti-reflection film, so that in the touch mode, the light rays entering the image sensor 200 are full-spectrum light rays including infrared light rays. It is understood that in practical applications, the anti-reflection film 400 may be other types of anti-reflection film 400 according to actual needs, which is not limited thereto. In addition, the anti-reflection film 400 may be disposed at one side of the light collection surface of the lens 100 or at one side of the light emitting surface of the lens 100, which is not limited thereto.

In addition, it should be noted that, in the above exemplary embodiment, the anti-reflection film 400 may be moved to a position offset from the lens 100 in the photographing mode; in other embodiments, since the anti-reflection film 400 can enhance transmission intensity of light rays, in the method, when the floating touch camera module is in both of the photographing mode and the touch mode, the anti-reflection film 400 is controlled to directly face the lens 100.

In addition, in an optional embodiment provided in the present disclosure, the above step S02 specifically includes:

Step S021: when the intensity of ambient light rays is less than or equal to the preset value, controlling the infrared supplementary lighting lamp 700 to be turned on, recognizing and processing first sensing information and second sensing information of the image sensor 200 to obtain gesture motion information; where the first sensing information is sensing information obtained by the image sensor 200 when the infrared supplementary lighting lamp 700 is on, and the second sensing information is sensing information obtained by the image sensor 200 when the infrared supplementary lighting lamp 700 is off.

In addition, the above step S02 specifically further includes:

Step S022: when the intensity of ambient light rays is greater than the preset value, controlling the infrared supplementary lighting lamp 700 to be turned off, recognizing and processing sensing information of the image sensor 200 to obtain gesture motion information.

In the above solution, when the floating touch camera module is in the touch mode and the ambient light rays are sufficient, the image sensor 200 sufficiently receives natural light rays including infrared light rays to form sensing information, thereby capturing hand movements. The image processor 500 recognizes and processes the sensing information to obtain gesture motion information, thereby realizing floating touch. When the floating touch camera module 10 is in the touch mode and the ambient light rays are insufficient, the infrared supplementary lighting lamp 700 flashes to emit infrared light rays to the ambient environment. At this point, the image sensor 200 receives two kinds of light rays from the lens 100, i.e., one is the normal ambient light rays, and the other is the ambient light rays when the infrared supplementary lighting lamp 700 is on. The image sensor 200 forms the first sensing information when receiving the normal ambient light rays. The image sensor 200 forms the second sensing information when receiving the ambient light rays when the infrared supplementary lighting lamp 700 is on. In this way, two different gesture contour images can be formed, and the image processor 500 can accurately capture motion commands through image recognition and image fusion correction, thereby realizing the floating touch.

In addition, in an optional embodiment provided in the present disclosure, before the step S01, the method further includes:

Step S11: determining a user operation instruction when the floating touch camera module is turned on; where the user operation instruction includes that the user's current operation is photographing operation or the user's current operation is touch operation; and Step S12: controlling the floating touch camera module to switch between the photographing mode and the touch mode according to a determination result.

In the above solution, when the camera is turned on, the user's current operation instruction is first determined, that is, determining whether the user's current operation is a photographing operation or a touch operation, and transmitting a determination result to the controller 800 and the image processor 500. The controller 800 switches to the photographing mode when the user's current operation is the photographing operation; and switches to the touch mode when the user's current operation is the touch operation. When the user's current operation is the photographing operation, the image processor 500 recognizes and processes the sensing information of the image sensor 200 and forms image information, thereby realizing the photographing function. When the user's current operation is the touch operation, the image processor 500 recognizes and processes the sensing information of the image sensor 200 and forms gesture motion information, thereby realizing the touch function.

The above are merely the optional embodiments of the present disclosure. It should be noted that, a person skilled in the art may make improvements and modifications without departing from the principle of the present disclosure, and these improvements and modifications shall also fall within the scope of the present disclosure.

What is claimed is:

1. An electronic device comprising:
   a floating touch camera module comprising:
   a lens with a light collection surface and a light emitting surface;
   an image sensor at one side of the light emitting surface of the lens; wherein the image sensor is configured to receive light rays from the lens and form sensing information; and
   an infrared cut filter film at one side of a light incident surface of the image sensor and configured to filter out infrared light rays;
   wherein the infrared cut filter film is movable relative to the lens between a first position at which the infrared cut filter film directly faces the lens and a second position at which the infrared cut filter film is offset from the lens, to enable the floating touch camera module to switch between a photographing mode and a touch mode;

an image processor electrically coupled with the image sensor of the floating touch camera module;

wherein the image processor is configured to, process sensing information of the image sensor to obtain image information when the floating touch camera module is in the photographing mode; and, recognize sensing information of the image sensor to obtain gesture motion information when the floating touch camera module is in the touch mode;

wherein the image processor comprises a first recognizer coupled with the image sensor;

wherein the first recognizer is configured to, when the intensity of ambient light rays is less than or equal to the preset value, recognize and process first sensing information and second sensing information of the image sensor to obtain gesture motion information;

wherein the first sensing information is sensing information obtained by the image sensor when the infrared supplementary lighting lamp is on, and the second sensing information is sensing information obtained by the image sensor when the infrared supplementary lighting lamp is off.

2. The electronic device according to claim 1, wherein the infrared cut filter film is at one side of the light collection surface of the lens.

3. The electronic device according to claim 1, wherein the infrared cut filter film is between the light emitting surface of the lens and the light incident surface of the image sensor.

4. The electronic device according to claim 1, wherein the floating touch camera module further comprises an anti-reflection film; the anti-reflection film is at one side of the light incident surface of the image sensor.

5. The electronic device according to claim 4, wherein the anti-reflection film is at one side of the light collection surface of the lens.

6. The electronic device according to claim 5, wherein the anti-reflection film is fixedly disposed at a position at which the anti-reflection film directly faces the lens.

7. The electronic device according to claim 5, wherein the anti-reflection film is movable relative to the lens between a third position at which the anti-reflection film is offset from the lens and a fourth position at which the anti-reflection film directly faces the lens.

8. The electronic device according to claim 4, wherein the anti-reflection film is between the light emitting surface of the lens and the light incident surface of the image sensor.

9. The electronic device according to claim 4, wherein the anti-reflection film is a full-spectrum anti-reflection film.

10. The electronic device according to claim 4, wherein the floating touch camera module further comprises a moving structure; the moving structure drives the infrared cut filter film to move relative to the lens between the first position and the second position; the moving structure drives the anti-reflection film to move relative to the lens between a third position at which the anti-reflection film is offset from the lens and a fourth position at which the anti-reflection film directly faces the lens.

11. The electronic device according to claim 1, wherein the floating touch camera module further comprises a moving structure; the moving structure drives the infrared cut filter film to move relative to the lens between the first position and the second position.

12. The electronic device according to claim 1, wherein the floating touch camera module further comprises:

a light intensity detector configured to detect intensity of ambient light rays; and an infrared supplementary lighting lamp coupled with the light intensity detector and configured to emit infrared light rays to ambient environment when the intensity of ambient light rays is less than or equal to a preset value.

13. A touch method, applied to the electronic device according to claim 1, comprising:

controlling the infrared cut filter film of the floating touch camera module of the electronic device to move from a first position at which the infrared cut filter film directly faces the lens of the floating touch camera module to a second position at which the infrared cut filter film is offset from the lens; and recognizing sensing information of the image sensor of the floating touch camera module to obtain gesture motion information, wherein recognizing sensing information of the image sensor of the floating touch camera module to obtain gesture motion information, comprises:

when the intensity of ambient light rays is less than or equal to the preset value, controlling the infrared supplementary lighting lamp of the floating touch camera module to flash;

using the image sensor to obtain first sensing information when the infrared supplementary lighting lamp is on and second sensing information when the infrared supplementary lighting lamp is off; and recognizing and processing the first sensing information and the second sensing information of the image sensor to obtain gesture motion information.

14. The method according to claim 13, wherein the floating touch camera module further comprises an anti-reflection film; and the method further comprises: controlling the anti-reflection film to directly face the lens.

15. The method according to claim 13, wherein the floating touch camera module further comprises an anti-reflection film; and the method further comprises: controlling the anti-reflection film to move between a third position at which the anti-reflection film is offset from the lens and a fourth position at which the anti-reflection film directly faces the lens.

* * * * *